United States Patent
Fuke et al.

(10) Patent No.: US 8,878,662 B2
(45) Date of Patent: Nov. 4, 2014

(54) VEHICLE DRIVING ASSISTANCE DEVICE

(75) Inventors: Tetsuya Fuke, Ebina (JP); Akihiro Makiyama, Yokohama (JP); Shigeyuki Sakaguchi, Yokohama (JP); Yutaka Kawamoto, Yokohama (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 0 days.

(21) Appl. No.: 13/812,992

(22) PCT Filed: Jul. 5, 2011

(86) PCT No.: PCT/JP2011/065347
§ 371 (c)(1),
(2), (4) Date: Jan. 29, 2013

(87) PCT Pub. No.: WO2012/014638
PCT Pub. Date: Feb. 2, 2012

(65) Prior Publication Data
US 2013/0120126 A1  May 16, 2013

(30) Foreign Application Priority Data

Jul. 30, 2010  (JP) .................................. 2010-171325

(51) Int. Cl.
| B60Q 1/00 | (2006.01) |
| B60K 35/00 | (2006.01) |
| F02D 11/10 | (2006.01) |
| B60W 50/14 | (2012.01) |

(52) U.S. Cl.
CPC ............ *B60Q 1/00* (2013.01); *B60W 2050/146* (2013.01); *B60K 2350/1092* (2013.01); *F02D 2200/602* (2013.01); *B60K 35/00* (2013.01); *F02D 11/105* (2013.01); *B60W 2510/0604* (2013.01); *F02D 11/106* (2013.01)
USPC ............. 340/439; 340/438; 340/441; 701/70; 701/123

(58) Field of Classification Search
USPC .............. 340/439, 441, 438; 701/70, 93, 110, 701/123; 123/349, 350, 399, 492, 493
See application file for complete search history.

(56) References Cited

U.S. PATENT DOCUMENTS

| 6,480,106 | B1* | 11/2002 | Crombez et al. ............... 340/461 |
| 8,037,870 | B2* | 10/2011 | Saito et al. ..................... 123/492 |
| 8,311,722 | B2* | 11/2012 | Zhang et al. ................... 701/104 |
| 2009/0251304 | A1 | 10/2009 | Saito et al. | |
| 2011/0241864 | A1* | 10/2011 | Fujiki et al. .................... 340/439 |

FOREIGN PATENT DOCUMENTS

| JP | 2007-315889 A | 12/2007 |
| JP | 2008-105559 A | 5/2008 |
| JP | 2008-174150 A | 7/2008 |
| JP | 2009-156132 A | 7/2009 |
| JP | 2010-163166 A | 7/2010 |

* cited by examiner

*Primary Examiner* — Toan N Pham
(74) *Attorney, Agent, or Firm* — Foley & Lardner LLP

(57) ABSTRACT

A vehicle operation support apparatus includes an indicator section for indicating an actual value of a parameter and a target value of the parameter for an operator to manipulate the parameter with reference to the target value, wherein the parameter is manipulated by the operator for changing an engine output of a vehicle. In the vehicle operation support apparatus, a change amount of an indication in the indicator section with respect to a unit change amount of the actual value of the parameter is relatively small in a region close to the target value.

6 Claims, 4 Drawing Sheets

VEHICLE DRIVING ASSISTANCE DEVICE

TECHNICAL FIELD

The present invention relates to a vehicle operation support apparatus for supporting operator's vehicle operation, for example, to improve specific fuel consumption (fuel efficiency) of a motor vehicle.

BACKGROUND ART

As a vehicle operation support apparatus for supporting operator's vehicle operation, an accelerator opening indicating apparatus is disclosed, for example, by a patent document 1. This apparatus is configured to indicate a target accelerator opening in an indicator section in the form of a bar chart or the like, wherein the target accelerator opening is favorable in view of fuel efficiency and is determined based on current vehicle speed and others; and indicate an actual accelerator opening in the same indicator section under condition that the actual accelerator opening and the target accelerator opening overlap with each other or are arranged next to each other. Operator's accelerator opening manipulation for conforming the indicated target accelerator opening and actual accelerator opening to each other, results in guiding operator's accelerator opening manipulation for the vehicle to be operated under a condition where the fuel efficiency is good. In the case of patent document 1, although the value of the target accelerator opening varies according to vehicle speed or the like, the position where the target accelerator opening is indicated is fixed irrespective of variation of the target accelerator opening, and the actual accelerator opening is indicated in an indicator section having a bar chart form or the like, as a ratio with respect to the target accelerator opening.

In the case of the vehicle operation support apparatus described above, it is necessary to visually recognize indication of each of the target accelerator opening and the actual accelerator opening, and operate an accelerator pedal so as to make the indicated position of actual accelerator opening get as close to the indicated position of target accelerator opening as possible without exceeding the indicated position of target accelerator opening. There is a problem that it is difficult to correctly visually recognize and delicately manipulate the actual accelerator opening in a region close to the target accelerator opening. Especially, in cases that the actual accelerator opening is indicated as a ratio with respect to the target accelerator opening as in patent document 1, when the target accelerator opening gets small according to vehicle speed or the like, it is further difficult to conform the actual accelerator opening to the target accelerator opening, because a small change in the actual accelerator opening by the operator causes a large change in the indicated position.

PRIOR ART DOCUMENT(S)

Patent Document(s)

Patent Document 1: JP 2008-105559 A

SUMMARY OF THE INVENTION

The present invention is a vehicle operation support apparatus comprising: an indicator section for indicating an actual value of a parameter and a target value of the parameter for an operator to manipulate the parameter with reference to the target value, wherein the parameter is manipulated by the operator for changing an engine output of a vehicle; wherein sensitivity of a change amount of an indication in the indicator section with respect to a unit change amount of the actual value of the parameter is relatively small in a region close to the target value.

The feature that the sensitivity is relatively small results in a decrease in change of indication of actual value with respect to the same change of the parameter that is accelerator pedal opening or the like. This serves to suppress excessively sensitive change of the indication of actual value resulting from operator's manipulation, and makes easy operator's manipulation based on visual recognition about the difference between actual value and target value.

According to the vehicle operation support apparatus of this invention, the feature that the sensitivity of change of the indication corresponding to operator's manipulation of the parameter that is accelerator pedal opening or the like, makes easy operator's operation to make the actual value approach the target value. Therefore, it is possible to reliably bring the accelerator pedal opening or the like, which is manipulated by the operator, toward a target accelerator pedal opening that is favorable in fuel efficiency.

MODE(S) FOR CARRYING OUT THE INVENTION

The following describes an embodiment of the present invention in detail with reference to the drawings. The embodiment is targeted for accelerator pedal opening as a parameter representative of engine output, wherein the accelerator pedal opening is manipulated by an operator. The embodiment is configured to guide the accelerator pedal opening to a target accelerator pedal opening that is optimal in view of fuel efficiency.

Figure 1:
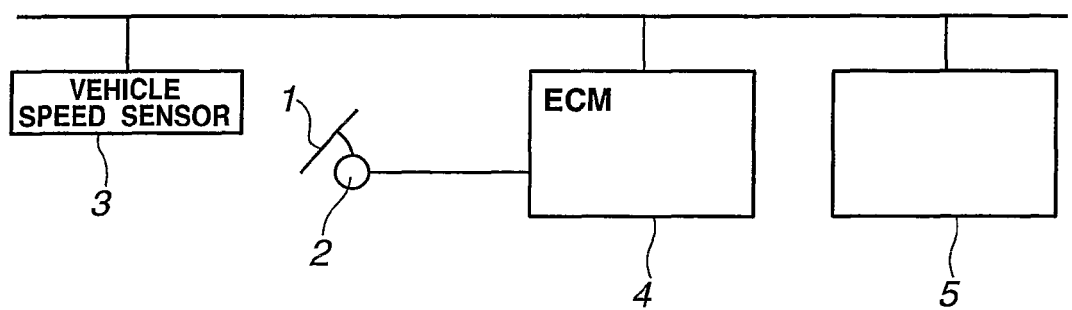
FIG. 1 is a configuration illustration diagram showing an embodiment of the present invention.

FIG. 1 is a configuration illustration diagram showing system configuration of a vehicle operation support apparatus of this embodiment, which includes an accelerator pedal opening sensor 2 and a vehicle speed sensor 3, wherein accelerator pedal opening sensor 2 is a potentiometer or the like that senses an amount of depression of an accelerator pedal 1 that is operated or depressed by an operator, namely, accelerator pedal opening, and wherein vehicle speed sensor 3 senses vehicle speed of an automotive vehicle. Sensing signals are inputted from accelerator pedal opening sensor 2 and vehicle speed sensor 3 into an engine control unit 4. Engine control unit 4 calculates an optimal target accelerator pedal opening based on the vehicle speed sensed by the vehicle speed sensor 3, and indicates the target accelerator pedal, opening in an indicator section 5 described below, and determines a current actual accelerator pedal opening based on the sensing signal of the accelerator pedal opening sensor 2, and indicates the actual accelerator pedal opening in indicator section 5 similarly. The engine control unit 4 is in charge of overall control for an engine not shown that is a gasoline engine or diesel engine, controlling the opening of a throttle valve and the quantity of fuel injection based on the accelerator pedal opening, and thereby adjusting the output of the engine, when the engine is a gasoline engine.

Figure 2:
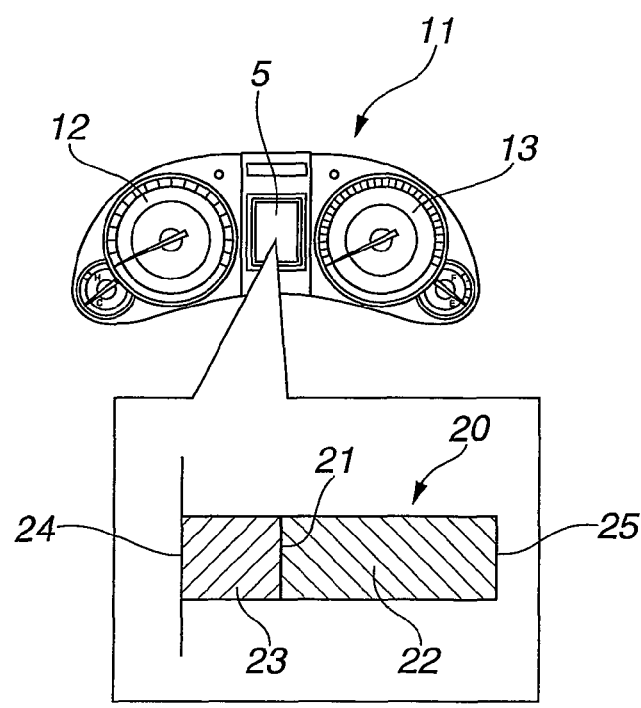
FIG. 2 is an illustration diagram showing an example of an indicator section of a driver-side instrument panel.

FIG. 2 is an example of a driver's side instrument panel 11, wherein instrument panel 11 includes the indicator section 5. Indicator section 5 is disposed between a vehicle speed meter 12 and a torque meter 13, and is made of a liquid crystal display configured to display various kinds of information. The indicator section 5 composed of this liquid crystal display is configured to selectively switch various kinds of information by mode switching by a suitable switch, and display them in a numeral form indicative of temperature or time, or in various graphical forms.

The indication of accelerator pedal opening according to this invention is in the form of a bar chart that extends horizontally as shown as an enlarged view in FIG. 2, which is henceforth referred to as accelerator indicator 20. A target accelerator pedal opening (represented by sign 21) is set as a boundary, wherein a favorable fuel efficiency region 22 where accelerator pedal opening is smaller than the target accelerator pedal opening and an unfavorable fuel efficiency region 23 where accelerator pedal opening is larger than the target accelerator pedal opening are displayed in different colors. For example, favorable fuel efficiency region 22 emits green light, whereas unfavorable fuel efficiency region 23 emits blue light. Target accelerator pedal opening 21 is indicated by a solid line in FIG. 2, but actually indicated by a boundary between the two different colors. In the present embodiment, the indicated position of target accelerator pedal opening 21 in accelerator indicator 20 is fixed constantly. The left end 24 of accelerator indicator 20 corresponds to a fully open condition of accelerator pedal opening, whereas the right end 25 of accelerator indicator 20 corresponds to a fully closed condition of accelerator pedal opening. The positions of left end 24 and right end 25 are also fixed constantly.

FIG. 2 corresponds to the fully closed condition where accelerator pedal 1 is not depressed, under which the entire area of favorable fuel efficiency region 22 emits green light. As accelerator pedal 1 is depressed under this condition, the light turns off gradually from the right end 25 of accelerator indicator 20 in accordance with the accelerator pedal opening. Specifically, the current actual accelerator pedal opening (i.e. the actual value of accelerator pedal opening) is indicated by the boundary between the area emitting light and the area emitting no light (in other words, indicated by the right end position of the area emitting light).

Figure 6A:
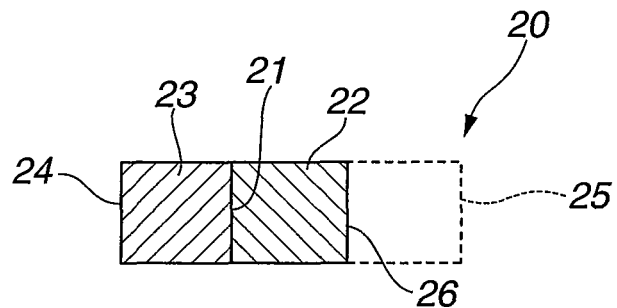
FIG. 6 is an illustration diagram showing an example of indication of an accelerator indicator.
Figure 6B:
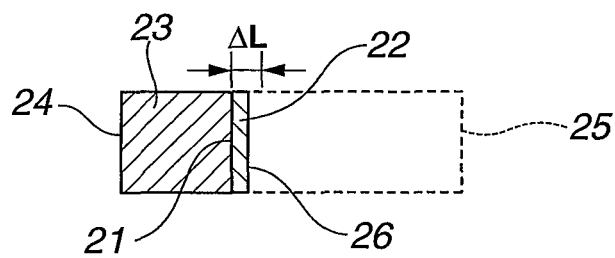
Figure 6C:
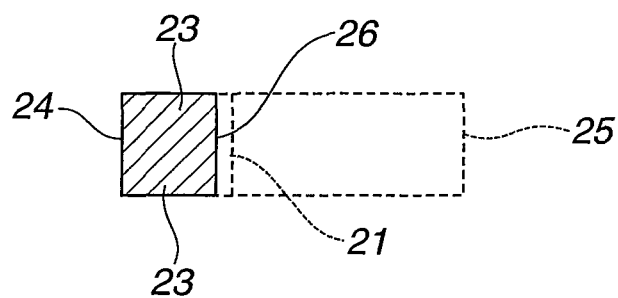

FIG. 6 shows an example of indication of accelerator indicator 20, wherein FIG. 6A corresponds to a condition where the actual accelerator pedal opening (represented by sign 26) is significantly smaller than target accelerator pedal opening 21, and wherein unfavorable fuel efficiency region 23 emits blue light and favorable fuel efficiency region 22 emits green light as described above. Accordingly, the operator can recognize that there is a sufficient margin to target accelerator pedal opening 21, since the area emitting green color light is large. FIG. 6B corresponds to a condition where the actual accelerator pedal opening 26 is sufficiently close to target accelerator pedal opening 21. Accordingly, the operator can recognize that the current condition is close to target accelerator pedal opening 21, because the area emitting green light is small. Moreover, FIG. 6C corresponds to a condition where the actual accelerator pedal opening 26 has exceeded the target accelerator pedal opening 21. Accordingly, the operator can easily recognize that the accelerator pedal opening is excessively large, because there is no area emitting green light and there is only the area emitting blue light.

Figure 3:
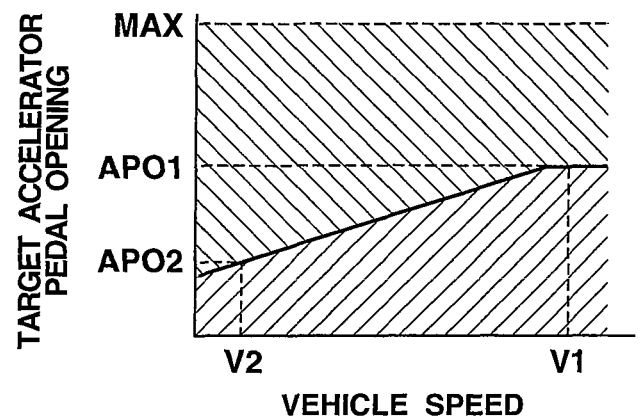
FIG. 3 is a characteristic diagram showing a characteristic of a target accelerator pedal opening with respect to vehicle speed.

FIG. 3 shows a basic characteristic of target accelerator pedal opening that is set depending on vehicle speed. As shown in FIG. 3, the target accelerator pedal opening increases as the vehicle speed increases. The region where the accelerator pedal opening is smaller than the target accelerator pedal opening is the favorable fuel efficiency region, whereas the region the accelerator pedal opening is larger than the target accelerator pedal opening is the unfavorable fuel efficiency region. Other parameters than vehicle speed may be taken into account to set a further optimal target accelerator pedal opening. The present invention may be adapted to cases where the target accelerator pedal opening is set in account of a factor other than fuel efficiency, for example, in account of acceleration, noise, or vehicle safety.

The target accelerator pedal opening is thus variably set depending on vehicle speed or the like. However, as described above, the indicated position of target accelerator pedal opening 21 in accelerator indicator 20 is constant. Accordingly, in accelerator indicator 20, the actual accelerator pedal opening 26 is indicated as a ratio to target accelerator pedal opening 21.

Figure 4:
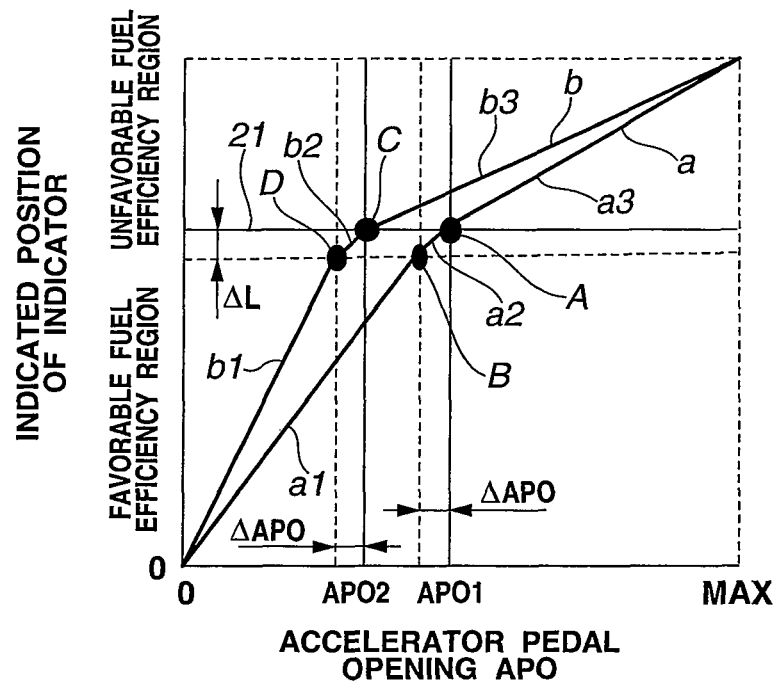
FIG. 4 is a characteristic diagram showing a relationship between accelerator pedal opening and indicated position.

FIG. 4 shows a relationship between accelerator pedal opening APO and the indicated position in accelerator indicator 20, where the horizontal axis represents the accelerator pedal opening APO, and the vertical axis represents the indicated position in accelerator indicator 20 (the position of the right end 25 is defined as zero). A characteristic "a" is a characteristic when the vehicle speed is high as V1 in FIG. 3, and target accelerator pedal opening APO1 is large. The horizontal solid line indicated by sign 21 represents the indicated position of the target accelerator pedal opening that is constant as described above. Accordingly, the characteristic a passes through an intersection point A at which the solid line 21 intersects with the vertical solid line indicative of target accelerator pedal opening APO1. Basically, it changes linearly from the point where accelerator pedal opening APO is equal to zero (the point on the left and lower part of FIG. 4) to the intersection point A. It also changes linearly from the intersection point A to the point where accelerator pedal opening APO is maximized (the point on the right and upper part of FIG. 4) at a different gradient. The indicated position of actual accelerator pedal opening in accelerator indicator 20 is determined by the characteristic a. Accordingly, the gradient of linear change of the characteristic a indicates sensitivity of a change amount of the indicated position in accelerator indicator 20 with respect to a unit change amount of actual accelerator pedal opening. As the sensitivity increases, a change amount of the indicated position with respect to a predetermined change amount of actual accelerator pedal opening increases.

In this embodiment, a sensitivity change point is set as an accelerator pedal opening that is smaller by a specific opening $\Delta APO$ than target accelerator pedal opening APO1. Between the sensitivity change point and the target accelerator pedal opening APO1 is provided a specific sensitivity (namely, gradient) that is relatively small. Accordingly, as shown in FIG. 4, the characteristic a is composed of three straight lines, i.e. a segment a1, a segment a2, and a segment a3, wherein the segment a1 connects a point B corresponding to the sensitivity change point and the point where accelerator pedal opening APO is equal to zero (the point on the left and lower part of FIG. 4), the segment a2 connects the point B and the intersection point A, and the segment a3 is from the intersection point A to the point where accelerator pedal opening APO is maximized (the point on the right and upper part of FIG. 4).

The sensitivity of the segment a2 is lower than that of the segment a1, and the sensitivity of the segment a3 is further lower than that of the segment a2.

A characteristic "b" is a characteristic when the vehicle speed is low as V2 in FIG. 3, and accordingly, target accelerator pedal opening APO2 is small. The characteristic b passes through an intersection point C between the solid line 21 and the vertical solid line of target accelerator pedal opening APO2. As in the case of characteristic a, the characteristic b is provided with a sensitivity change point that is an accelerator pedal opening smaller by specific opening ΔAPO than target accelerator pedal opening APO2. Between the sensitivity change point and the target accelerator pedal opening APO2 is provided a specific sensitivity that is relatively small and equal to that of the segment a2 of the characteristic a.

Specifically, as shown in FIG. 4, the characteristic b is composed of three straight lines, i.e. a segment b1, a segment b2, and a segment b3, wherein the segment b1 connects a point D corresponding to the sensitivity change point and the point where accelerator pedal opening APO is equal to zero (the point on the left and lower part of FIG. 4), the segment b2 connects the point D and the intersection point C, and the segment b3 is from the intersection point C to the point where accelerator pedal opening APO is maximized (the point on the right and upper part of FIG. 4). The sensitivity of the segment b2 is lower than that of the segment b1, and the sensitivity of the segment b3 is further lower than that of the segment b2. The sensitivity of segment b2 is equal to that of the segment a2 of the characteristic a, as described above. Accordingly, even if the target accelerator pedal opening changes according to vehicle speed or the like, the sensitivity of the segment between the target accelerator pedal opening and the sensitivity change point is constant. Moreover, the difference in accelerator pedal opening ΔAPO between the target accelerator pedal opening and the sensitivity change point is constant irrespective of variation of the target accelerator pedal opening. Accordingly, a width ΔL (see also FIG. 6) in accelerator indicator 20 between the target accelerator pedal opening and the sensitivity change point is constantly fixed.

According to the embodiment described above, in the case where target accelerator pedal opening APO1 is set as in the characteristic a, as the operator depresses accelerator pedal 1, the indicated position (see sign 26 in FIG. 6) of actual accelerator pedal opening changes in conformance with the sensitivity (gradient) of the segment a1. When it approaches target accelerator pedal opening APO1 and shifts into the segment a2 (within the range of width ΔL in accelerator indicator 20), the sensitivity of change of indicated position falls. Accordingly, when the operator is trying to conform the actual accelerator pedal opening 26 to the target accelerator pedal opening 21 in accelerator indicator 20 as shown in FIG. 6B, the operator is allowed to easily adjust accelerator pedal 1, which serves to ensure that the accelerator pedal opening APO manipulated by the operator is guided to target accelerator pedal opening APO1.

Especially, if target accelerator pedal opening APO2 is small as in the characteristic b, the sensitivity (gradient) of the segment b1 is large because the target accelerator pedal opening APO2 is indicated at the same position 21 in accelerator indicator 20. This makes it difficult to conform the actual accelerator pedal opening APO to the target accelerator pedal opening APO2. In the present embodiment, even when target accelerator pedal opening APO2 is so small, it is easy to adjust accelerator pedal 1 because the sensitivity in the region ΔL close to target accelerator pedal opening 21 in accelerator indicator 20 is constantly low. Incidentally, in contrast to the sensitivity (gradient) of the segment a2, b2 that is constant with respect to variation of target accelerator pedal opening, the sensitivity (gradient) of the segment a1, b1 varies according to target accelerator pedal opening. Accordingly, the ratio of decrease of sensitivity through the sensitivity change point is larger in the characteristic b where the target accelerator pedal opening is smaller.

As is clear from FIG. 4, if the target accelerator pedal opening further increases according to vehicle speed or the like, it is possible that the sensitivity (gradient) of the first segment corresponding to the segment a1, b1 is equal to (or lower than) the sensitivity (gradient) of the segment a2, b2. Accordingly, in such a region, it is unnecessary to reduce the sensitivity in the segment ΔAPO (width ΔL in accelerator indicator 20).

Figure 5:
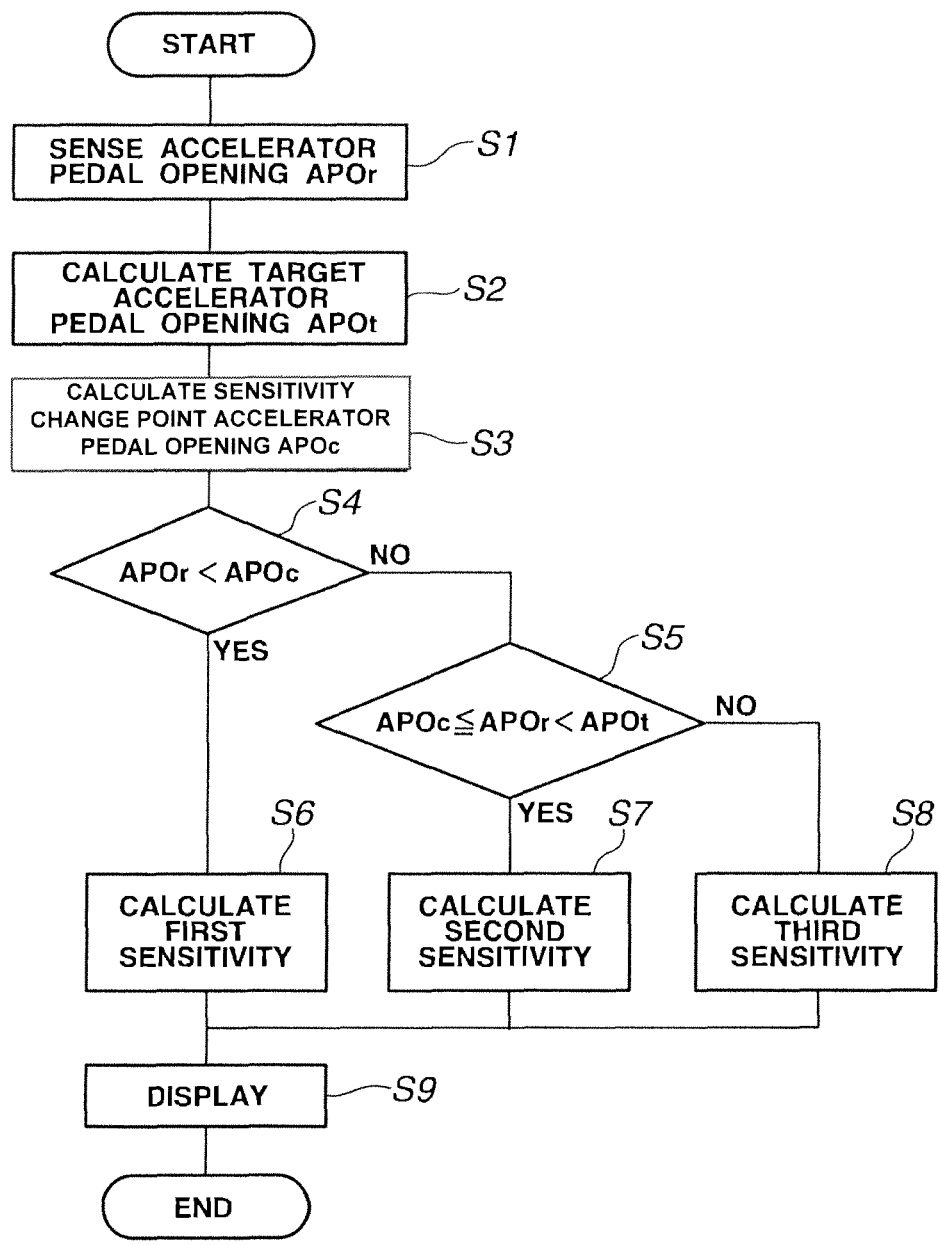
FIG. 5 is a flow chart showing a flow of process of display.

FIG. 5 shows as a flow chart a process of display of accelerator pedal opening in conformance with the characteristics of FIG. 4. At Step S1, it senses a current actual accelerator pedal opening APOr from an output signal from accelerator pedal opening sensor 2. At Step S2, it determines an optimal target accelerator pedal opening APOt based on vehicle speed or the like. At Step S3, it determines a sensitivity change point accelerator pedal opening APOc by subtracting the specific opening ΔAPO from the target accelerator pedal opening APOt. At Steps S4 and S5, it determines which of the three segments the actual accelerator pedal opening APOr is in. Specifically, actual accelerator pedal opening APOr and target accelerator pedal opening APOt are compared with each other in view of magnitude. When actual accelerator pedal opening APOr is in the first segment, namely, when actual accelerator pedal opening APOr is smaller than sensitivity change point accelerator pedal opening APOc, it then proceeds from Step S4 to Step S6 where the first sensitivity is calculated which is necessary for the first segment. When actual accelerator pedal opening APOr is in the second segment, namely, when actual accelerator pedal opening APOr is larger than or equal to sensitivity change point accelerator pedal opening APOc and smaller than target accelerator pedal opening APOt, it then proceeds from Step S5 to Step S7 where the second sensitivity is calculated which is necessary for the second segment. As discussed above, the second sensitivity may be a fixed value. When actual accelerator pedal opening APOr is in the third segment, namely, when actual accelerator pedal opening APOr is larger than target accelerator pedal opening APOt, it then proceeds from Step S5 to Step S8 where the third sensitivity is calculated which is necessary for the third segment. Finally, at Step S9, it calculates an indicated position in accelerator indicator 20, and displays it as shown in FIG. 6.

Although the foregoing describes an embodiment of the present invention, the invention is not limited to the embodiment, but may be modified in various manners. For example, although target accelerator pedal opening 21 and actual accelerator pedal opening 26 are indicated in accelerator indicator 20 in the form of bar chart under condition that target accelerator pedal opening 21 and actual accelerator pedal opening 26 overlap with each other, target accelerator pedal opening 21 and actual accelerator pedal opening 26 may be displayed next to each other. Moreover, for example, an arc-shaped indicator may be adopted which extends along the periphery of a circular meter or vehicle speed meter 12. Accelerator indicator 20 may be configured by a plurality of liquid crystal segments which are arranged discretely.

Moreover, although each characteristic in FIG. 4 is composed of linear characteristics whose gradients are switched discretely, the characteristic may be nonlinear. The sensitivity may be set low in a specific range including the target accelerator pedal opening 21 at an intermediate point. Although the embodiment is targeted for accelerator pedal opening as a parameter manipulated by an operator, it may be targeted for indicating another parameter representative of engine output, such as intake air quantity, fuel supply quantity, or throttle lever opening. Although the indicated position of target accelerator pedal opening 21 in accelerator indicator 20 is constantly fixed, but may be varied.

The invention claimed is:

1. A vehicle operation support apparatus comprising:
   an indicator section for indicating an actual value of a parameter and a target value of the parameter for an operator to manipulate the parameter with reference to the target value, wherein the parameter is manipulated by the operator for changing an engine output of a vehicle;
   wherein a change amount of an indication in the indicator section with respect to a unit change amount of the actual value of the parameter is relatively small in a region close to the target value.

2. The vehicle operation support apparatus as claimed in claim 1, wherein:
   the target value is indicated in a fixed position in the indicator section irrespective of variation of the target value; and
   the actual value is indicated as a ratio to the target value.

3. The vehicle operation support apparatus as claimed in claim 2, wherein the change amount of the indication is reduced through a change point of the parameter by a ratio of reduction, wherein the change point is set between zero and the target value, and wherein the ratio of reduction increases as the target value decreases.

4. The vehicle operation support apparatus as claimed in claim 3, wherein the change amount of the indication in a segment between the change point and the target value is constant with respect to variation of the target value.

5. The vehicle operation support apparatus as claimed in claim 2, wherein reduction of the change amount of the indication is inhibited when the target value is greater than a predetermined value.

6. The vehicle operation support apparatus as claimed in claim 1, wherein the parameter is an accelerator pedal opening of the vehicle.

* * * * *